(12) United States Patent
Terry et al.

(10) Patent No.: US 12,555,802 B2
(45) Date of Patent: Feb. 17, 2026

(54) HYDROGEN GAS SYSTEM FOR COMBINED REFRIGERATION AND POWER

(71) Applicant: Carrier Corporation, Palm Beach Gardens, FL (US)

(72) Inventors: Clayton Terry, East Syracuse, NY (US); Bart Antonie van Hassel, Weatogue, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 342 days.

(21) Appl. No.: 18/174,049

(22) Filed: Feb. 24, 2023

(65) Prior Publication Data

US 2023/0278399 A1 Sep. 7, 2023

Related U.S. Application Data

(60) Provisional application No. 63/315,287, filed on Mar. 1, 2022.

(51) Int. Cl.
*H01M 8/04089* (2016.01)
*B60H 1/00* (2006.01)
(Continued)

(52) U.S. Cl.
CPC .... *H01M 8/04089* (2013.01); *B60H 1/00378* (2013.01); *B60H 1/00385* (2013.01); *F17C 1/12* (2013.01); *H01M 8/04208* (2013.01); *F17C 2203/03* (2013.01); *F17C 2205/0323* (2013.01); *F17C 2221/012* (2013.01);
(Continued)

(58) Field of Classification Search
None
See application file for complete search history.

(56) References Cited

U.S. PATENT DOCUMENTS 3,364,688 A * 1/1968 Matlow ............... F17C 3/08
62/45.1
3,433,384 A * 3/1969 Caruthers, Jr. ..... F16L 13/0281
220/560.04
(Continued)

FOREIGN PATENT DOCUMENTS

CN 112009349 A 12/2020
CN 112242539 A * 1/2021
(Continued)

OTHER PUBLICATIONS

CN113022417 A English Machine Translation (Year: 2021).*
(Continued)

*Primary Examiner* — Jenna M Maroney
(74) *Attorney, Agent, or Firm* — CANTOR COLBURN LLP

(57) ABSTRACT

A transport refrigeration unit (TRU) system is usable with a refrigerated cargo system. The TRU system includes a fuel cell configured to generate power for the TRU so that the TRU can refrigerate an interior compartment of the refrigerated cargo system, a cryo-compressed fuel tank to store a supply of cryo-compressed hydrogen, a heat exchanger and a conduit system configured to transport the cryo-compressed hydrogen from the cryo-compressed fuel tank, through the heat exchanger for promoting refrigeration of the interior compartment, and to the fuel cell.

16 Claims, 6 Drawing Sheets

(51) Int. Cl.
   *F17C 1/12* (2006.01)
   *H01M 8/04082* (2016.01)
(52) U.S. Cl.
   CPC .............. *F17C 2223/0161* (2013.01);
   *F17C 2223/036* (2013.01); *F17C 2227/0355*
   (2013.01); *F17C 2270/0171* (2013.01); *F17C 2270/0184* (2013.01)

(56) References Cited

U.S. PATENT DOCUMENTS

| | | | | |
|---|---|---|---|---|
| 6,059,016 | A * | 5/2000 | Rafalovich | ............ F28D 20/02 165/41 |
| 8,955,338 | B2 * | 2/2015 | Jung | ................. F17C 3/00 62/50.7 |
| 2007/0251685 | A1 | 11/2007 | Viegas | |
| 2008/0152976 | A1 * | 6/2008 | Uehara | ............ H01M 8/04059 429/454 |
| 2014/0260403 | A1 * | 9/2014 | Connell | ................ B60H 1/3202 62/434 |

FOREIGN PATENT DOCUMENTS

| | | | | |
|---|---|---|---|---|
| CN | 113022417 | A | | 6/2021 |
| CN | 114962993 | A * | | 8/2022 |
| DE | 19531122 | A1 * | 2/1997 | ........... B60H 1/3202 |
| DE | 102016216525 | A1 * | 3/2018 | |
| DE | 102016221089 | A1 | 4/2018 | |
| DE | 102014202663 | B4 * | 8/2022 | ........ H01M 8/04014 |
| EP | 3524464 | A2 * | 8/2019 | ........ B60H 1/00364 |
| EP | 3750725 | A1 * | 12/2020 | ........ B60H 1/00428 |
| FR | 3013647 | A1 | 5/2015 | |
| JP | 2004345426 | A * | 12/2004 | ......... B60H 1/00385 |
| JP | 4186473 | B2 * | 11/2008 | |
| JP | 4396938 | B2 | 10/2009 | |
| JP | 2011121541 | A | 6/2011 | |
| KR | 20070059308 | A * | 6/2007 | |
| KR | 2020041033 | A * | 4/2020 | ............ B60H 1/321 |
| WO | WO-2014160458 | A1 * | 10/2014 | ........... B60H 1/3202 |
| WO | WO-2017176682 | A1 * | 10/2017 | ......... B60H 1/00428 |
| WO | WO-2018226649 | A1 * | 12/2018 | ........ B60H 1/00014 |
| WO | WO-2022150474 | A1 * | 7/2022 | ................ F17C 7/00 |
| WO | WO-2024020003 | A1 * | 1/2024 | |

OTHER PUBLICATIONS

DE102016216525A1 English Machine Translation (Year: 2018).*
Bolaji et al., "Theoretical investigation of the performance of some environment-friendly refrigerants in a sub-cooling heat exchanger refrigeration system" Journal of Science and Technology, vol. 30, No. 3 (Dec. 2010) pp. 101-108.
Kunze et al., "Cryo-Compressed Hydrogen Storage" BMW Efficient Dynamics, BMW Group, Cryogenic Cluster Day (Sep. 28, 2012) pp. 1-33.
Yang et al., "On-board liquid hydrogen cold energy utilization system for a heavy-duty fuel cell hybrid truck" World Electric Vehicle Journal, vol. 12, No. 136 (Aug. 2021) pp. 1-13.
Search Report issued in European Patent Application No. 23159501.8; Application Filing Date Mar. 1, 2023; Date of Mailing Jul. 31, 2023 (10 pages).
European Search Report for EP 23159501.8, Issued Jan. 30, 2025, 18 pages.

* cited by examiner

HYDROGEN GAS SYSTEM FOR COMBINED REFRIGERATION AND POWER

CROSS-REFERENCE TO RELATED APPLICATIONS

This application claims priority to U.S. Provisional Application Ser. No. 63/315,287, filed Mar. 1, 2022, the contents of which are hereby incorporated by reference in its entirety.

BACKGROUND

The following description relates to a hydrogen gas system and, more specifically, to hydrogen gas system for combined refrigeration and power.

Trailers are used to transport goods. Trailers typically have a rectangular shape and an empty interior that can be filled with various types of perishable and non-perishable goods. In some cases, those goods need to be maintained at a certain controlled temperature and in these cases, trailers can include refrigeration units, such as transport refrigeration units (TRUs). A TRU for a trailer can cool or condition the air inside of the trailer so that the goods being transported are maintained at a controlled temperature.

In conventional TRUs, energy to operate the TRU can be provided by fuel or batteries. More recently, fuel cells that use hydrogen to generate energy have been employed.

BRIEF DESCRIPTION

According to an aspect of the disclosure, a transport refrigeration unit (TRU) system is provided for use with a refrigerated cargo system. The TRU system includes a fuel cell configured to generate power for the TRU so that the TRU can refrigerate an interior compartment of the refrigerated cargo system, a cryo-compressed fuel tank to store a supply of cryo-compressed hydrogen, a heat exchanger and a conduit system configured to transport the cryo-compressed hydrogen from the cryo-compressed fuel tank, through the heat exchanger for promoting refrigeration of the interior compartment, and to the fuel cell.

In accordance with additional or alternative embodiments, the cryo-compressed fuel tank is supported below a bottom wall of the trailer.

In accordance with additional or alternative embodiments, the cryo-compressed fuel tank stores the supply of the cryo-compressed hydrogen at least about 350 bars and as low as about 45 Kelvin.

In accordance with additional or alternative embodiments, the conduit system includes a conduit connecting the cryo-compressed fuel tank and the heat exchanger, the conduit including insulation surrounding an external surface of the conduit.

In accordance with additional or alternative embodiments, the cryo-compressed hydrogen is transported through the heat exchanger for refrigerating the interior compartment.

In accordance with additional or alternative embodiments, an auxiliary fuel tank stores an additional supply of hydrogen and the conduit system is further configured to transport hydrogen from the auxiliary fuel tank to the fuel cell.

In accordance with additional or alternative embodiments, the cryo-compressed hydrogen is transported through the heat exchanger for cooling refrigerant used to cool the interior of the trailer.

In accordance with additional or alternative embodiments, the conduit system is further configured to transport the cryo-compressed hydrogen from the cryo-compressed fuel tank and directly to the fuel cell.

According to an aspect of the disclosure, a transport refrigeration unit (TRU) system is provided for use with a refrigerated cargo system. The TRU system includes a fuel cell configured to generate power for a TRU so that the TRU can refrigerate an interior compartment of the refrigerated cargo system, a cryo-compressed fuel tank to store a supply of cryo-compressed hydrogen, a radiator and fan assembly disposed within the interior of the trailer and a conduit system configured to transport the cryo-compressed hydrogen from the cryo-compressed fuel tank, through the radiator and fan assembly for refrigeration of the interior compartment, and to the fuel cell.

In accordance with additional or alternative embodiments, the cryo-compressed fuel tank is supported below a bottom wall of the trailer and stores the supply of the cryo-compressed hydrogen at least about 350 bars and as low as about 45 Kelvin.

In accordance with additional or alternative embodiments, the conduit system includes a conduit connecting the cryo-compressed fuel tank and the subcooler, the conduit including insulation surrounding an external surface of the conduit.

In accordance with additional or alternative embodiments, the radiator and fan assembly is disposed vertically above the cryo-compressed fuel tank to shorten a distance between the cryo-compressed fuel tank and the radiator and fan assembly and a length of the conduit.

In accordance with additional or alternative embodiments, an auxiliary fuel tank stores an additional supply of hydrogen and the conduit system is further configured to transport hydrogen from the auxiliary fuel tank to the fuel cell.

In accordance with additional or alternative embodiments, the TRU system further includes a refrigeration system including a subcooler for cooling refrigerant used to cool the interior of the trailer and the conduit system includes a valve, which is controllable to direct a transportation of the cryo-compressed hydrogen through at least one of the radiator and fan assembly and the subcooler.

According to an aspect of the disclosure, a transport refrigeration unit (TRU) system is provided for use with a refrigerated cargo system. The TRU system includes a fuel cell configured to generate power for a TRU so that the TRU can refrigerate an interior compartment of the refrigerated cargo system, a cryo-compressed fuel tank to store a supply of cryo-compressed hydrogen, a refrigeration system comprising a subcooler and a conduit system configured to transport the cryo-compressed hydrogen from the cryo-compressed fuel tank, through the subcooler for cooling refrigerant used to cool the interior compartment, and to the fuel cell.

In accordance with additional or alternative embodiments, the cryo-compressed fuel tank is supported below a bottom wall of the trailer and stores the supply of the cryo-compressed hydrogen at least about 350 bars and as low as about 45 Kelvin.

In accordance with additional or alternative embodiments, the conduit system includes a conduit connecting the cryo-compressed fuel tank and the subcooler, the conduit including insulation surrounding an external surface of the conduit.

In accordance with additional or alternative embodiments, the refrigeration system includes a refrigeration cycle with the subcooler interposed between a condenser and an expansion valve.

In accordance with additional or alternative embodiments, the conduit system is further configured to transport the cryo-compressed hydrogen from the cryo-compressed fuel tank and directly to the fuel cell.

In accordance with additional or alternative embodiments, the TRU system further includes a radiator and fan assembly disposed within the interior compartment for refrigeration of the interior compartment and the conduit system includes a valve, which is controllable to direct a transportation of the cryo-compressed hydrogen through at least one of the sub-cooler and the radiator and fan assembly.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

Recent proposals for powering TRUs have involved the use of fuel cells as a power source for refrigeration components. In such cases, conventional designs use two completely different fluids and systems for refrigeration and for fuel cell power. In other conventional cases, refrigeration and power generation systems are only loosely thermally coupled with evaporator air flows used to cool the fuel cell. Thus, as will be described below, the use of hydrogen-powered or Hz-powered fuel cells to generate power for a refrigeration system opens opportunities to use sustainable and clean fuels. The use of Hz-powered fuel cells also allows for greater thermal coupling between refrigeration, fuel-cell power systems, and hydrogen storage systems.

A primary gaseous hydrogen cryo-tank maintains cryo-compressed $H_2$ at a temperature and pressure of at least about 350 bars and as low as 45 Kelvin. This hydrogen may be used to refrigerate a trailer by controlling its flow through an evaporator in an interior of the trailer. The resulting Hz-gas may be used in a fuel cell to generate power required for refrigeration and other subsystems, including fans, controllers and auxiliary batteries as needed for system optimization and reliability. In addition, with the primary gaseous hydrogen cryo-tank being provided to store the cryo-compressed $H_2$ to be ultimately used in a fuel cell, a temperature of the cryo-compressed $H_2$ is increased (close to ambient) before it reaches the fuel cell. This may be done by providing subcooling to refrigerant in a heat exchanger of a refrigeration loop where the much lower temperature of the cryo-compressed $H_2$ can be well matched with the already condensed refrigerant. The heat exchanger and the pipes leading to it may be specially designed to avoid freezing of the refrigerants used in the refrigeration system and blockages of refrigerant channels. The flow of the cryo-compressed hydrogen can be determined by current in a fuel cell stack and a number of cells within the stack. A bypass loop could supply directly the cryo-compressed $H_2$ to the fuel cell without subcooling the refrigerant if it were properly warmed up.

Figure 1:
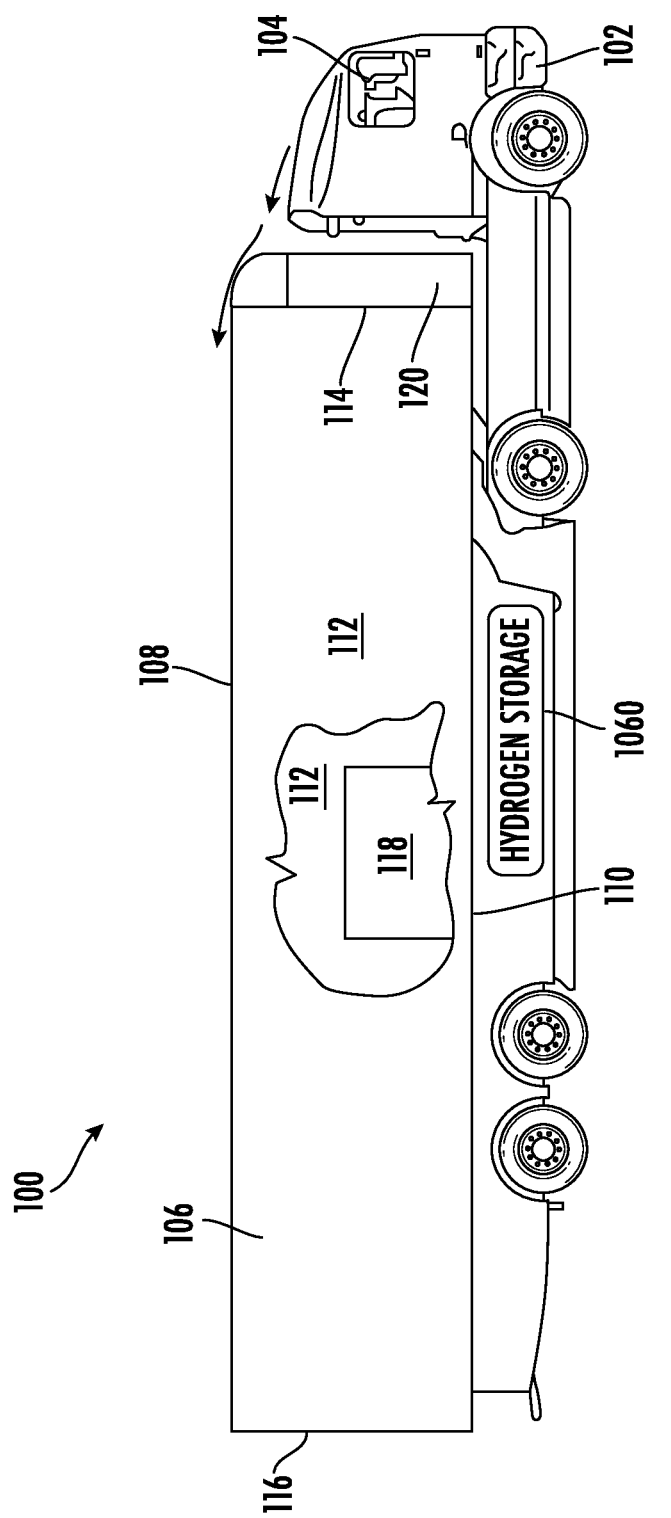
FIG. 1 depicts a tractor trailer system having a transport refrigeration unit and a cargo compartment, in accordance with exemplary embodiments.

With reference to FIG. 1, a tractor trailer system 100 is provided. The tractor trailer system 100 includes a tractor 102 including an operator's compartment or cab 104 and an engine, which acts as the drive system of the tractor trailer system 100, though it is to be understood that the tractor 102 could also be driven autonomously. A trailer 106 is coupled to the tractor 102. The trailer 106 is a refrigerated trailer 106 and includes a top wall 108, a directly opposed bottom wall 110, opposed side walls 112 and a front wall 114, with the front wall 114 being closest to the tractor 102. The trailer 106 further includes a door or doors (not shown) at a rear wall 116, opposite the front wall 114. The walls of the trailer 106 define a cargo compartment. The trailer 106 is configured to maintain a cargo 118 located inside the cargo compartment at a selected temperature through the use of a transport refrigeration unit 120 located on the trailer 106. The transport refrigeration unit 120, as shown in FIG. 1, can be located at or attached to the front wall 114. Although described herein that the transport refrigeration unit may be attached to a tractor trailer, it should be appreciated that the transport refrigeration unit described herein may be suitable for any refrigerated cargo system (e.g., tractor trailer, container, unit load device, etc.).

Figure 2:
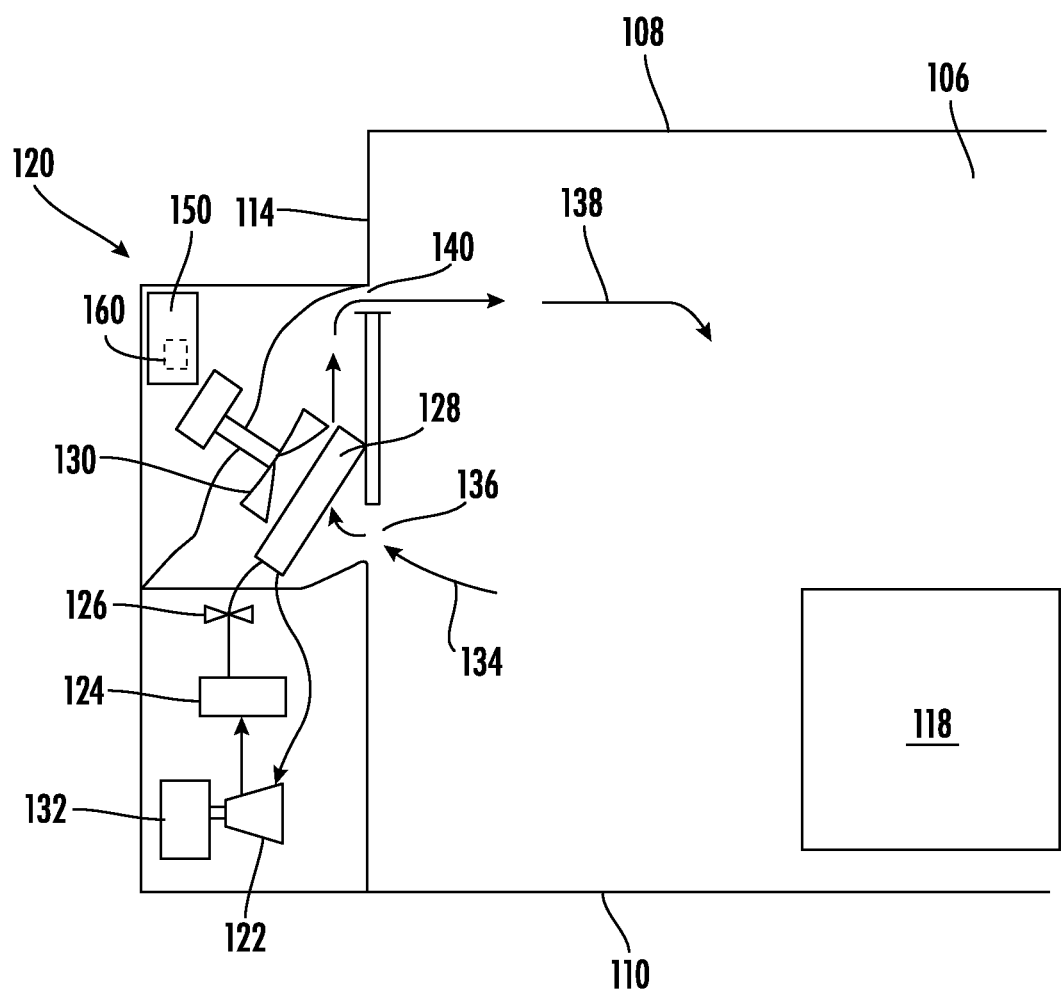
FIG. 2 depicts a transport refrigeration unit for a cargo compartment of the tractor trailer system of FIG. 1, in accordance with exemplary embodiments.

With reference to FIG. 2, the transport refrigeration unit 120 is shown in more detail. The transport refrigeration unit 120 includes a compressor 122, a condenser 124, an expansion valve 126, an evaporator 128 and an evaporator fan 130. The compressor 122 is operably connected to a power source 132, which drives the compressor 122. An economizer could be provided so that some refrigerant is evaporated at a midpoint pressure level to precool the rest of the refrigerant evaporating in the evaporator. Airflow is circulated into and through the cargo compartment of the trailer 106 by means of the transport refrigeration unit 120. A return airflow 134 flows into the transport refrigeration unit 120 from the cargo compartment of the trailer 106 through a refrigeration unit inlet 136 and across the evaporator 128 via the evaporator fan 130, thus cooling the return airflow 134. The cooled return airflow 134, now referred to as supply airflow 138, is supplied into the cargo compartment of the trailer 106 through a refrigeration unit outlet 140, which in some embodiments is located near the top wall 108 of the trailer 106. The supply airflow 138 cools the cargo 118 in the cargo compartment of the trailer 106. Also included in the cargo compartment can be a refrigerant leak sensor 150 for detecting a leak of a particular type of refrigerant or substance. It is to be understood that the refrigerant leak sensor 150 can be located in different locations in the system and is not limited by the example shown in FIG. 2. For example, the refrigerant leak sensor 150 can be located in the evaporator section of the transport refrigeration unit 120, a different portion of the cargo compartment of the trailer 106 or another location in the system. Upon detection by the refrigerant leak sensor 150, a signal can be transmitted to controller 160. The controller 160 controls various aspects of the transport refrigeration unit 120 and the transport refrigeration unit power system. The controller 160 can control the compressor 122, the condenser 124, the economizer, the expansion valve 126, the evaporator 128 and the evaporator fan 130 in addiction to other equipment or sensors. The controller 160 can be connected to the equipment over a wired or wireless connection (connections not shown). In some cases, the controller 160 can be configured to perform a low charge diagnostics calculation which is used to perform various calculations of the refrigeration system of the transport refrigeration unit 120 to determine a state of operation. In other embodiments, the low charge diagnostics calculation can be performed in a cloud network (not shown in FIG. 2).

Figure 3:
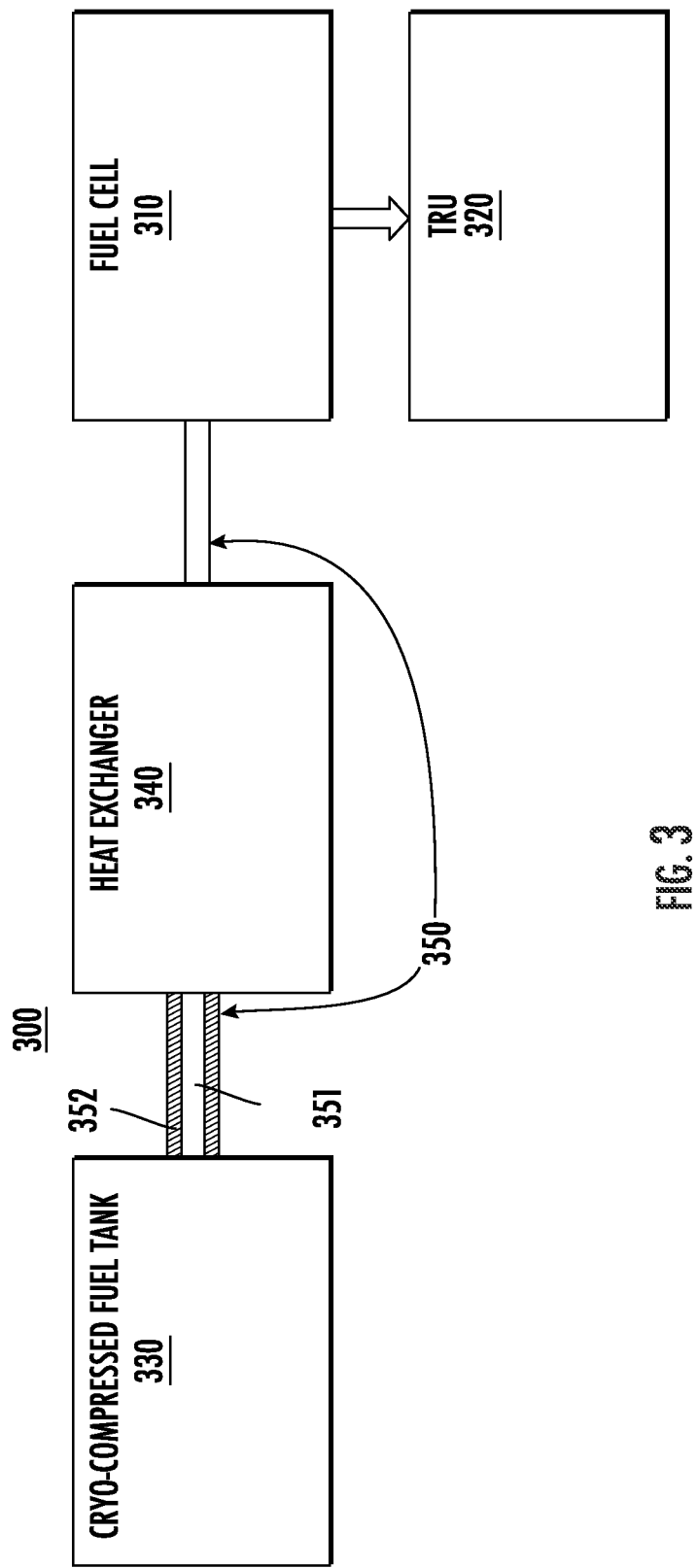
FIG. 3 is a schematic diagram of a transport refrigeration unit system including a heat exchanger, in accordance with exemplary embodiments.

With reference to FIG. 3, a TRU system 300 is provided for use with a refrigerated cargo system, such as the trailer 106 of FIG. 1. The TRU system 300 includes a fuel cell 310 that is configured to generate power for a TRU 320, such as the transport refrigeration unit 120 of FIG. 2 so that the TRU 320 can refrigerate an interior compartment (e.g., the cargo compartment of the trailer 106 of FIG. 1). In this way, the fuel cell 310 can serve as the power source 132 of FIG. 2. The TRU system 300 also includes a cryo-compressed fuel tank 330 (shown in FIG. 1 as hydrogen storage 1060) to store a supply of cryo-compressed hydrogen, a heat exchanger 340 and a conduit system 350. The cryo-compressed fuel tank 330 can be supported for example below the bottom wall 110 of the trailer 106 of FIG. 1 and can store cryo-compressed hydrogen (i.e., $H_2$) at least about 350 bars and as low as about 45 Kelvin. The conduit system 350 is configured to transport the cryo-compressed hydrogen from the cryo-compressed fuel tank 330, through the heat exchanger 340 for promoting refrigeration of for example the interior of the trailer 106 (i.e., the cargo compartment of the trailer 106 of FIG. 1) and to the fuel cell 310.

In this way, the enthalpy of the cryo-compressed hydrogen can be used to promote the refrigeration of the interior of the trailer 106 as discussed in greater detail below and thus be converted into a form that is more usable in the fuel cell 310 for generating power for the TRU 320. As a result, any other tanks for storing hydrogen in the TRU system 300 can be reduced in size or capacity, even if only slightly, as compared to what would otherwise be required in conventional designs. Similarly, the TRU 320 can also be reduced in size or capacity as the flow of the cryo-compressed hydrogen through the heat exchanger to promote the refrigeration of the interior of the trailer 106 can in some cases remove some of the refrigeration load that would normally have to be met by only the TRU 320. This could be especially beneficial when the trailer 106 is operated in freezing mode at about −20° C. or about −30° C., where conventional TRUs would have somewhat limited cooling capacity.

In accordance with embodiments, the conduit system 350 can include a conduit 351 having opposed first and second ends and insulation 352. The conduit 351 is connected at the first end thereof to the cryo-compressed fuel tank 330 and at the second end thereof to the heat exchanger 340. The insulation 352 surrounds a substantial portion of the conduit 351 and allows the cryo-compressed hydrogen to remain substantially as pressurized and cold as it was inside the cryo-compressed fuel tank 300 until the cryo-compressed hydrogen reaches the heat exchanger 340.

In accordance with further embodiments, the heat exchanger 340 can be provided as a radiator and fan assembly disposed within the interior of the trailer 106. In these or other cases, the cryo-compressed hydrogen is transported through the radiator and fan assembly for refrigerating the interior of the trailer 106. In addition, in these or other cases, the TRU system 300 can further include an auxiliary fuel tank to store an additional supply of hydrogen, with the conduit system 350 being further configured to transport hydrogen from the auxiliary fuel tank to the fuel cell 310. These embodiments will be described in greater detail with reference to FIG. 4.

In accordance with further embodiments, the heat exchanger 340 can be provided as a subcooler of a refrigeration system for cooling the interior of the trailer 106. In these or other cases, the cryo-compressed hydrogen is transported through the subcooler for cooling refrigerant used to cool the interior of the trailer 106. In addition, in these or other cases, the conduit system 350 can be further configured to transport hydrogen from the cryo-compressed fuel tank 330 directly to the fuel cell 310 once a certain degree of warming inside the cryo-compressed fuel tank 330 has occurred. These embodiments will be described in greater detail with reference to FIG. 5.

Figure 4:
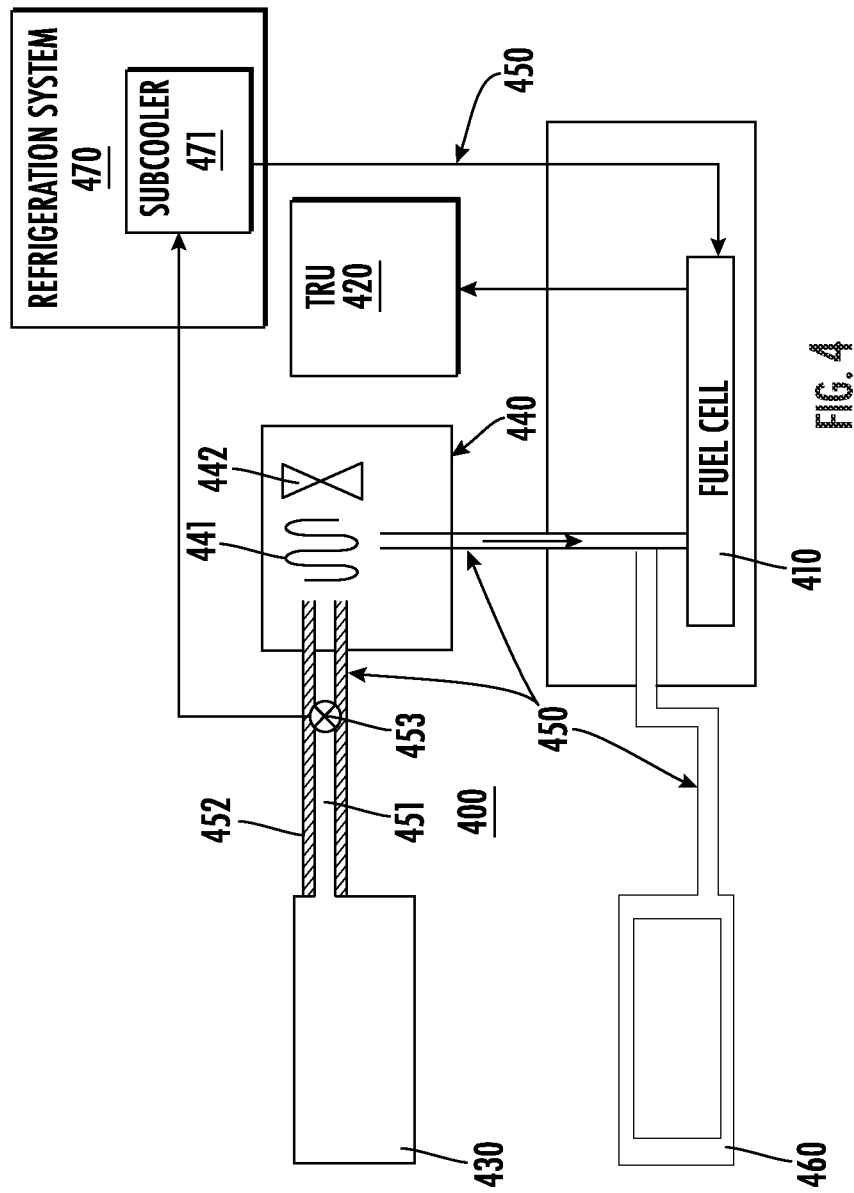
FIG. 4 is a schematic diagram of a transport refrigeration unit system including at least a radiator and fan assembly, in accordance with exemplary embodiments.

With reference to FIG. 4, a TRU system 400 is provided for use with a refrigerated cargo system, such as the trailer 106 of FIG. 1. The TRU system 400 includes a fuel cell 410 that is configured to generate power for at least a TRU 420, such as the transport refrigeration unit 120 of FIG. 2 so that the TRU 420 can refrigerate an interior compartment (e.g., the cargo compartment of the trailer 106 of FIG. 1). In this way, the fuel cell 410 can serve as the power source 132 of FIG. 2. The TRU system 400 also includes a cryo-compressed fuel tank 430 to store a supply of cryo-compressed hydrogen, a radiator and fan assembly 440 that is disposed within the interior of the trailer 106 and a conduit system 450. The cryo-compressed fuel tank 430 can be supported for example below the bottom wall 110 of the trailer 106 of FIG. 1 and can store cryo-compressed hydrogen (i.e., $H_2$) at least about 350 bars and as low as about 45 Kelvin. The conduit system 450 is configured to transport the cryo-compressed hydrogen from the cryo-compressed fuel tank 430, through the radiator and fan assembly 440 for refrigeration of the interior of the trailer 106 and to the fuel cell 410.

In this way, the enthalpy of the cryo-compressed hydrogen can be used to directly refrigerate the interior of the trailer 106 (which can have multiple zones) and can be converted into a form that is more usable in the fuel cell 410 for generating power for at least the TRU 420. As a result, any other tanks for storing hydrogen in the TRU system 400 can be reduced in size or capacity, even if only slightly, as compared to what would otherwise be required in conventional designs. Similarly, the TRU 420 can also be reduced in size or capacity as the flow of the cryo-compressed hydrogen through the radiator and fan assembly 440 to directly refrigerate the interior of the trailer 106 removes some of the refrigeration load that would normally have to be met by only the TRU 420. This could be especially beneficial when the trailer 106 is operated in freezing mode at about −20° C. or about −30° C., where conventional TRUs would have somewhat limited cooling capacity.

In accordance with embodiments, the conduit system 450 can include a conduit 451 having opposed first and second ends and insulation 452. The conduit 451 is connected at the first end thereof to the cryo-compressed fuel tank 430 and at the second end thereof to the radiator and fan assembly 440. The insulation 452 surrounds a substantial portion of the conduit 451 and allows the cryo-compressed hydrogen to remain substantially as pressurized and cold as it was inside the cryo-compressed fuel tank 430 until the cryo-compressed hydrogen reaches the radiator and fan assembly 440. The radiator and fan assembly 440 can include tubing 441 to carry the cryo-compressed hydrogen along a specified pathway (i.e., a serpentine pathway or coil) and a fan 442 to blow air over the tubing 441. Power for the fan 442 can be supplied by the fuel cell 410. In any case, the radiator and fan assembly 440 can be disposed vertically above the cryo-compressed fuel tank 430, either on a sidewall 112 or a top wall 108 of the trailer 106. This will effectively shorten a distance between the cryo-compressed fuel tank 430 and the radiator and fan assembly 440 as well as a length of the conduit 451 (positioning the radiator and fan assembly 440 on the top wall 108 could be the more efficient location due to cold air tending to flow downwardly and would be less obtrusive to loading and unloading of cargo, even if the conduit 451 in this case is slightly longer than the sidewall case).

A sensor can be disposed within the interior of the trailer 106 to monitor for hydrogen leaks. In addition, a valve can be provided to direct residual hydrogen out of the trailer 106.

In accordance with further embodiments, the TRU system 400 can further include an auxiliary fuel tank 460 to store an additional supply of hydrogen, with the conduit system 450 being further configured to transport hydrogen from the auxiliary fuel tank 460 and to the fuel cell 410. As noted above, a size and a capacity of the auxiliary fuel tank 460 can be reduced as compared to other similar fuel tanks in conventional service.

In accordance with further embodiments, the TRU system 400 can also include a refrigeration system 470 including a subcooler 471 for cooling refrigerant used to cool the interior of the trailer 106. In these or other cases, the cryo-compressed hydrogen is transported through the subcooler 471 for cooling refrigerant used to cool the interior of the trailer 106 (see FIG. 5). In addition, in these or other cases, the conduit system 450 can include a valve 453, which is controllable to direct a transportation of the cryo-compressed hydrogen through at least one of the radiator and fan assembly 440 and the subcooler 471.

Figure 5:
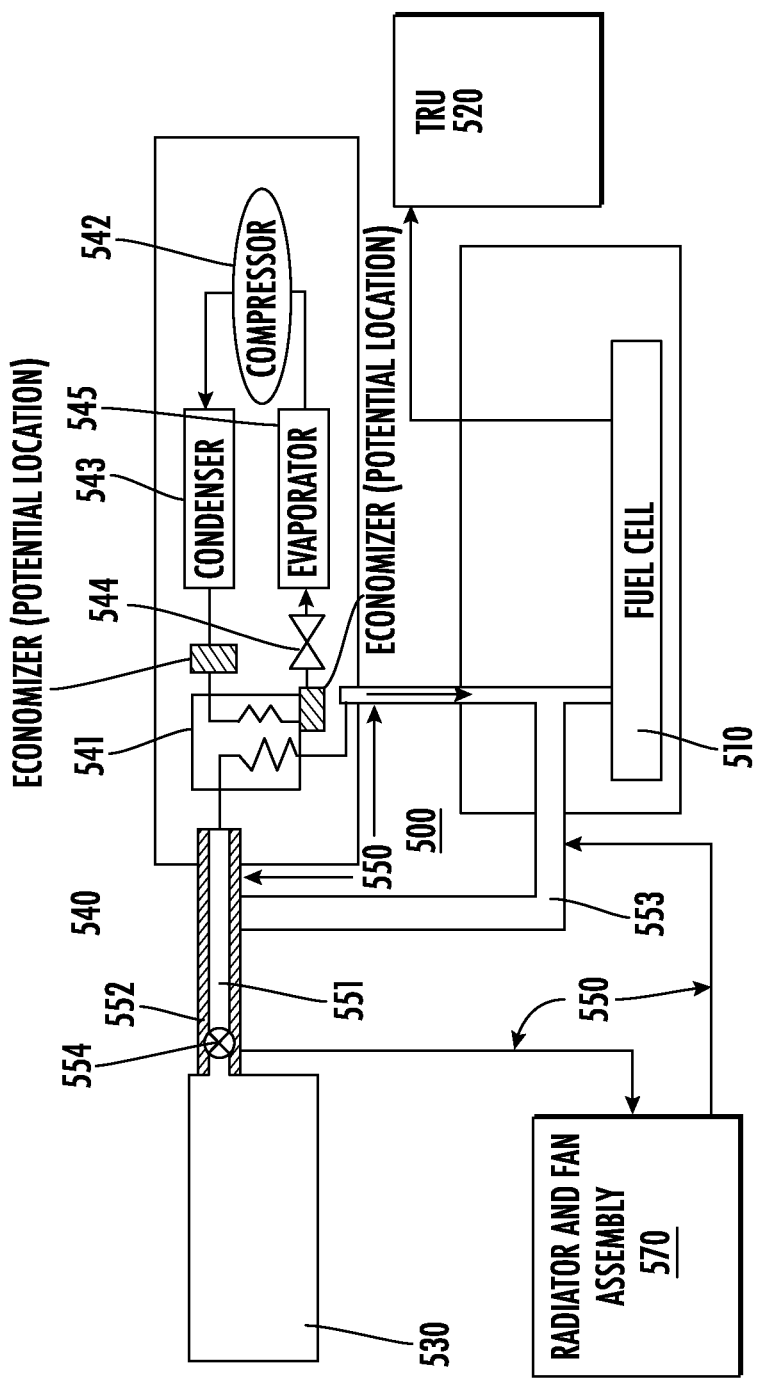
FIG. 5 is a schematic diagram of a transport refrigeration unit system including at least a refrigeration system including a subcooler, in accordance with exemplary embodiments.

With reference to FIG. 5, a TRU system 500 is provided for use with a trailer, such as the trailer 106 of FIG. 1. The TRU system 500 includes a fuel cell 510 that is configured to generate power for at least a TRU 520, such as the transport refrigeration unit 120 of FIG. 2 so that the TRU 520 can refrigerate an interior of the trailer (i.e., the cargo compartment of the trailer 106 of FIG. 1). In this way, the fuel cell 510 can serve as the power source 132 of FIG. 2. The TRU system 500 also includes a cryo-compressed fuel tank 530 to store a supply of cryo-compressed hydrogen, a refrigeration system 540 that includes a subcooler 541 and a conduit system 550. The cryo-compressed fuel tank 530 can be supported for example below the bottom wall 110 of the trailer 106 of FIG. 1 and can store cryo-compressed hydrogen (i.e., $H_2$) at least about 350 bars and as low as about 45 Kelvin. The conduit system 550 is configured to transport the cryo-compressed hydrogen from the cryo-compressed fuel tank 530, through the subcooler 541 for cooling refrigerant used to cool the interior of the trailer 106 and to the fuel cell 510.

It is to be understood that the refrigeration system 540 could include an economizer arranged upstream from or downstream from the subcooler 541. Where the economizer is downstream from the sub-cooler, sub-cooling will result in some improvement of cooling capacity and some reduction in electrical power. Where the economizer is upstream from the subcooler, most of the enthalpy of warming up the cold hydrogen becomes available as additional cooling capacity and there is minimal change in electrical power.

In this way, the enthalpy of the cryo-compressed hydrogen can be used to indirectly provide for refrigeration of the interior of the trailer 106 and can be converted into a form that is more usable in the fuel cell 510 for generating power for at least the TRU 520. As a result, any other tanks for storing hydrogen in the TRU system 500 can be reduced in size or capacity, even if only slightly, as compared to what would otherwise be required in conventional designs. Similarly, certain components of the refrigeration system 540 can also be reduced in size or capacity as the flow of the cryo-compressed hydrogen through the subcooler 541 provides for subcooling of refrigerant and this removes some of the cooling load that would normally have to be met by other components of the TRU 520. This could be especially beneficial when the trailer 106 is operated in freezing mode at about −20° C. or about −30° C., where conventional TRUs would have somewhat limited cooling capacity.

In accordance with embodiments, the conduit system 550 can include a conduit 551 having opposed first and second ends and insulation 552. The conduit 551 is connected at the first end thereof to the cryo-compressed fuel tank 530 and at the second end thereof to the subcooler 541. The insulation 552 surrounds a substantial portion of the conduit 551 and allows the cryo-compressed hydrogen to remain substantially as pressurized and cold as it was inside the cryo-compressed fuel tank 530 until the cryo-compressed hydrogen reaches the subcooler 541. The refrigeration system 540 includes a compressor 542, a condenser 543, an expansion valve 544 and an evaporator 545 with the subcooler 541 interposed between the condenser and the expansion valve 543 and an economizer as noted above. The compressor 542, the condenser 543, the expansion valve 544, the evaporator 545 and the economizer all operate in manners that will be understood by those of ordinary skill in the art and need not be described further. Power for at least the compressor 542 and various fans can be supplied by the fuel cell 510.

In accordance with further embodiments, the conduit system 550 can further include a bypass line 553 configured to transport the cryo-compressed hydrogen from the cryo-compressed fuel tank 530 and directly to the fuel cell 510. The bypass line 553 can include valving to control flows through the bypass line (i.e., to increase flows through the bypass line 553 as temperatures and pressures within the cryo-compressed fuel tank 530 adjust due to ambient conditions and the hydrogen stored therein can be used in the fuel cell 510). The bypass line can include a heat exchange element to provide for further warming.

In accordance with further embodiments, the TRU system 500 can also include a radiator and fan assembly 570 that is disposed within the interior of the trailer 106 for direct refrigeration of the interior of the trailer 106. In these or other cases, the cryo-compressed hydrogen is transported through the radiator and fan assembly 570 for direct refrigeration of the interior of the trailer 106 (see FIG. 4). In addition, in these or other cases, the conduit system 550 can include a valve 554, which is controllable to direct a transportation of the cryo-compressed hydrogen through at least one of the subcooler 541 and the radiator and fan assembly 570.

It is to be understood that, while the embodiments of FIGS. 4 and 5 are presented and described separately, various combinations of these embodiments are possible. For example, the auxiliary tank 460 of FIG. 4 could be included in the embodiments of FIG. 5. Similarly, the bypass line 553 of FIG. 5 could be included in the embodiments of FIG. 4. In addition, it is to be understood that other uses of the cryo-compressed hydrogen and the enthalpy associated with cryo-compressed hydrogen are available. These include, but are not limited to, the cooling of various electronics and components throughout the trailer 106 of FIG. 1 and the TRU 120 of FIG. 2 as well as the cooling of a low temperature cooling loop of the fuel cell 310/410/510.

Figure 6:
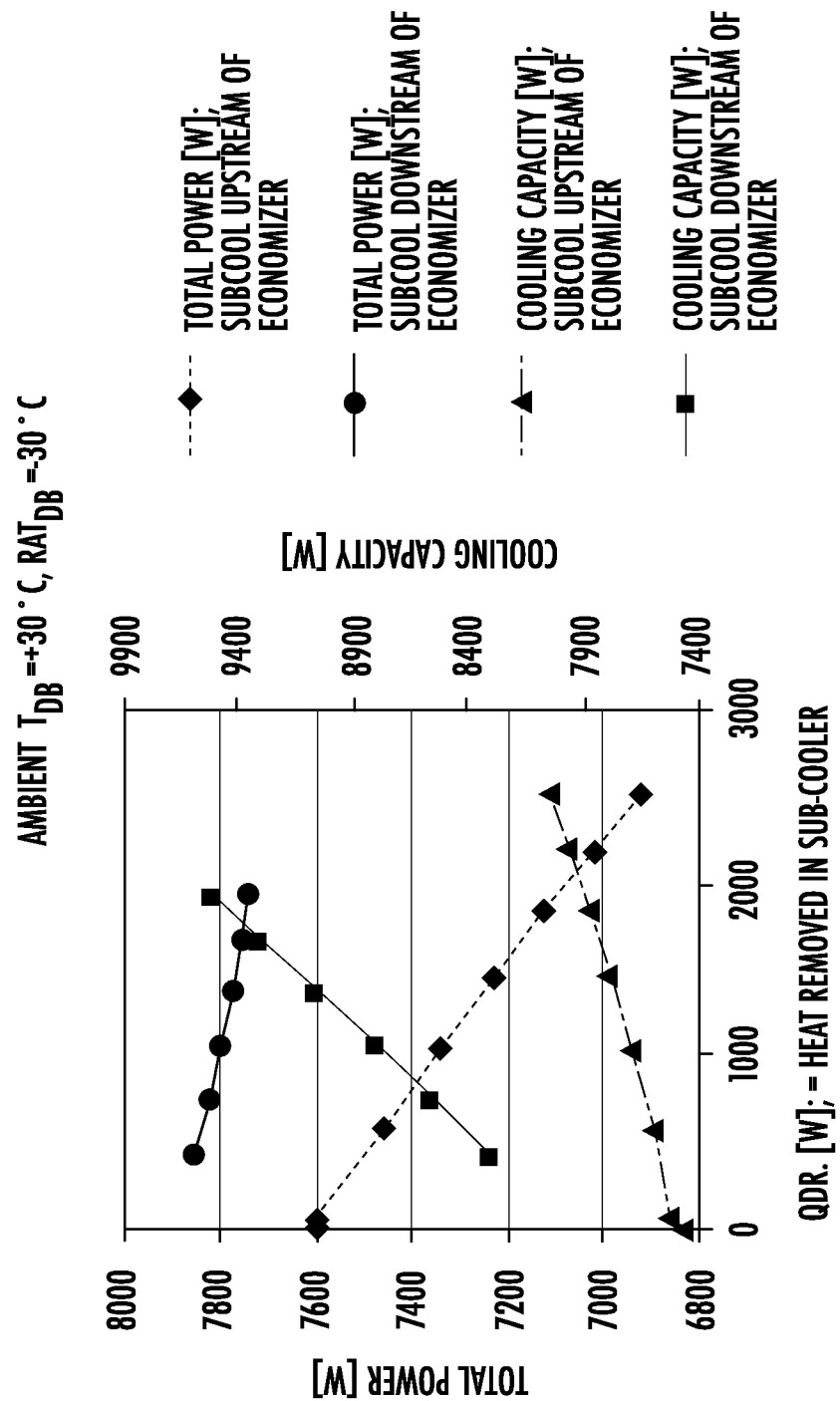
FIG. 6 is a graphical depiction of relationships between total power, heat removed in a sub-cooler and cooling capacity, in accordance with exemplary embodiments.

With reference to FIG. 6, it can be seen that removing heat from refrigerant in the sub-cooler (of FIG. 5 for example) increases cooling capacity and reduces cooling power, and the degree depends on whether the heat is removed with cold hydrogen before or after the economizer. A similar effect on cooling capacity is expected when the refrigeration cycle does not have an economizer.

Technical effects and benefits of the present disclosure are the provision of a refrigeration system that makes use of the energy invested in generating and storing cold hydrogen gas in a cryo-compressed hydrogen storage system in a way that makes it useful to refrigerating the trailer while at the same time warming up the hydrogen as required for the fuel cell system. In addition, further technical effects and benefits of the present disclosure are the provision of a refrigeration system that provides reductions of refrigeration load requirements, that integrates power and refrigeration systems, provides potentially higher efficiency and performance, has an ability to provide cryogenic temperature controls levels with a single system and reduces sizes of the refrigeration and power systems.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A transport refrigeration unit (TRU) system for use with a refrigerated cargo system of a trailer, the TRU system comprising:
   a fuel cell configured to generate power for the TRU so that the TRU can refrigerate an interior compartment of the trailer;
   a cryo-compressed fuel tank to store a supply of cryo-compressed hydrogen;
   a heat exchanger; and
   a conduit system configured to transport the cryo-compressed hydrogen from the cryo-compressed fuel tank, through the heat exchanger for promoting refrigeration of the interior compartment, and to the fuel cell,
   wherein the conduit system comprises a conduit connecting the cryo-compressed fuel tank and the heat exchanger, the conduit comprising insulation surrounding an entire external surface of the conduit from the cryo-compressed fuel tank to the heat exchanger.

2. The TRU system according to claim 1, wherein the cryo-compressed fuel tank is supported below a bottom wall of the trailer.

3. The TRU system according to claim 1, wherein the cryo-compressed fuel tank stores the supply of the cryo-compressed hydrogen at 350 bars and as low as 45 Kelvin.

4. The TRU system according to claim 1, wherein the cryo-compressed hydrogen is transported through the heat exchanger for refrigerating the interior compartment.

5. The TRU system according to claim 4, further comprising an auxiliary fuel tank to store an additional supply of hydrogen, wherein the conduit system is further configured to transport hydrogen from the auxiliary fuel tank to the fuel cell.

6. The TRU system according to claim 1, wherein the cryo-compressed hydrogen is transported through the heat exchanger for cooling refrigerant used to cool the interior compartment.

7. A transport refrigeration unit (TRU) system for use with a refrigerated cargo system of a trailer, the TRU system comprising:
   a fuel cell configured to generate power for the TRU so that the TRU can refrigerate an interior compartment of the trailer;
   a cryo-compressed fuel tank to store a supply of cryo-compressed hydrogen;
   a heat exchanger; and
   a conduit system configured to transport the cryo-compressed hydrogen from the cryo-compressed fuel tank, through the heat exchanger for promoting refrigeration of the interior compartment, and to the fuel cell,
   wherein:
   the cryo-compressed hydrogen is transported through the heat exchanger for cooling refrigerant used to cool the interior compartment, and
   the conduit system is further configured to transport the cryo-compressed hydrogen from the cryo-compressed fuel tank and directly to the fuel cell.

8. A transport refrigeration unit (TRU) system for use with a refrigerated cargo system of a trailer, the TRU system comprising:
   a TRU;
   a fuel cell configured to generate power for the TRU so that the TRU can refrigerate an interior compartment of the trailer;
   a cryo-compressed fuel tank to store a supply of cryo-compressed hydrogen;
   a radiator and fan assembly disposed within the interior compartment; and
   a conduit system configured to transport the cryo-compressed hydrogen from the cryo-compressed fuel tank, through the radiator and fan assembly for refrigeration of the interior compartment, and to the fuel cell,
   wherein the radiator and fan assembly is disposed vertically above the cryo-compressed fuel tank to shorten a distance between the cryo-compressed fuel tank and the radiator and fan assembly and a length of the conduit.

9. The TRU system according to claim 8, wherein the cryo-compressed fuel tank is supported below a bottom wall of the trailer and stores the supply of the cryo-compressed hydrogen at 350 bars and as low as 45 Kelvin.

10. The TRU system according to claim 8, wherein the conduit system comprises a conduit connecting the cryo-compressed fuel tank and the radiator and fan assembly, the conduit comprising insulation surrounding an external surface of the conduit.

11. The TRU system according to claim 8, further comprising an auxiliary fuel tank to store an additional supply of hydrogen, wherein the conduit system is further configured to transport hydrogen from the auxiliary fuel tank to the fuel cell.

12. A transport refrigeration unit (TRU) system for use with a refrigerated cargo system of a trailer, the TRU system comprising:
 a TRU;
 a fuel cell configured to generate power for the TRU so that the TRU can refrigerate an interior compartment of the trailer;
 a cryo-compressed fuel tank to store a supply of cryo-compressed hydrogen;
 a radiator and fan assembly disposed within the interior compartment; and
 a conduit system configured to transport the cryo-compressed hydrogen from the cryo-compressed fuel tank, through the radiator and fan assembly for refrigeration of the interior compartment, and to the fuel cell,
 wherein:
 the TRU system further comprises a refrigeration system comprising a subcooler for cooling refrigerant used to cool the interior compartment, and
 the conduit system comprises a valve, which is controllable to direct a transportation of the cryo-compressed hydrogen through at least one of the radiator and fan assembly and the subcooler.

13. A transport refrigeration unit (TRU) system for use with a refrigerated cargo system of a trailer, the TRU system comprising:
 a TRU;
 a fuel cell configured to generate power for the TRU so that the TRU can refrigerate an interior compartment of the trailer;
 a cryo-compressed fuel tank to store a supply of cryo-compressed hydrogen;
 a refrigeration system comprising a subcooler; and
 a conduit system configured to transport the cryo-compressed hydrogen from the cryo-compressed fuel tank, through the subcooler for cooling refrigerant used to cool the interior compartment, and to the fuel cell,
 wherein at least one of:
 the refrigeration system comprises a refrigeration cycle with the subcooler interposed between a condenser and an expansion valve, and
 the conduit system is further configured to transport the cryo-compressed hydrogen from the cryo-compressed fuel tank and directly to the fuel cell.

14. The TRU system according to claim 13, wherein the cryo-compressed fuel tank is supported below a bottom wall of the trailer and stores the supply of the cryo-compressed hydrogen at 350 bars and as low as 45 Kelvin.

15. The TRU system according to claim 13, wherein the conduit system comprises a conduit connecting the cryo-compressed fuel tank and the subcooler, the conduit comprising insulation surrounding an external surface of the conduit.

16. The TRU system according to claim 13, wherein:
 the TRU system further comprises a radiator and fan assembly disposed within the interior compartment for refrigeration of the interior compartment; and
 the conduit system comprises a valve, which is controllable to direct a transportation of the cryo-compressed hydrogen through at least one of the subcooler and the radiator and fan assembly.

* * * * *